June 5, 1934.    F. LEJEUNE    1,961,887
DIRECT CURRENT MOTOR CONTROL
Filed June 19, 1931    5 Sheets-Sheet 1

Inventor:—
Fernand Lejeune,
By: Smith, Michael & Gardiner, Attorneys.

June 5, 1934.   F. LEJEUNE   1,961,887
DIRECT CURRENT MOTOR CONTROL
Filed June 19, 1931   5 Sheets-Sheet 3

Inventor:-
Fernand Lejeune,
By:- Smith, Michael & Gardiner,
Attorneys.

Fig. 16.

Patented June 5, 1934

1,961,887

UNITED STATES PATENT OFFICE 1,961,887

DIRECT CURRENT MOTOR CONTROL

Fernand Lejeune, Paris, France, assignor to Forges & Ateliers de Constructions Electriques, de Jeumont, Societe Anonyme, Paris, France, a joint-stock company of France Application June 19, 1931, Serial No. 545,557
In France June 24, 1930

8 Claims. (Cl. 172—179)

This invention relates to direct current motor equipment, particularly of electric traction vehicles.

The invention comprises an improved motor control system for saving the energy usually wasted in resistances during the start in rheostatic motor starting systems; the system also provides for the recuperation of energy from the vehicle when being braked or while descending a gradient.

The present invention has for its objects:—

(1) To ensure the automatic regulation of the field strength of motors having independent or compound excitation, during the starting of the said motors, which is carried out by modifying their magnetic flux.

(2) To effect the automatic regulation in question while ensuring substantial constancy of the accelerating torque within the limits allowable for satisfactory commutation in the motors and for meeting the requirements of starting electric traction vehicles.

(3) To allow the recuperation and return to the supply line, of the braking energy or of the energy due to a down gradient, by reversibility of the system.

The invention is hereafter described with reference to the accompanying drawings, in which:—

Figures 15 and 16 illustrate the practical application of the control system shown in Figure 1, Figures 15a and 15b being sequence charts to explain the operation of the controller switches.

It is well known that in order to obtain a constant acceleration torque for electric motors during starting, the law to be fulfilled is:

$$\frac{\text{current taken}}{\text{speed}} = \text{constant},$$

or $I/N=k$, for a constant feed voltage applied to the motors.

Figures 1, 2, 17:
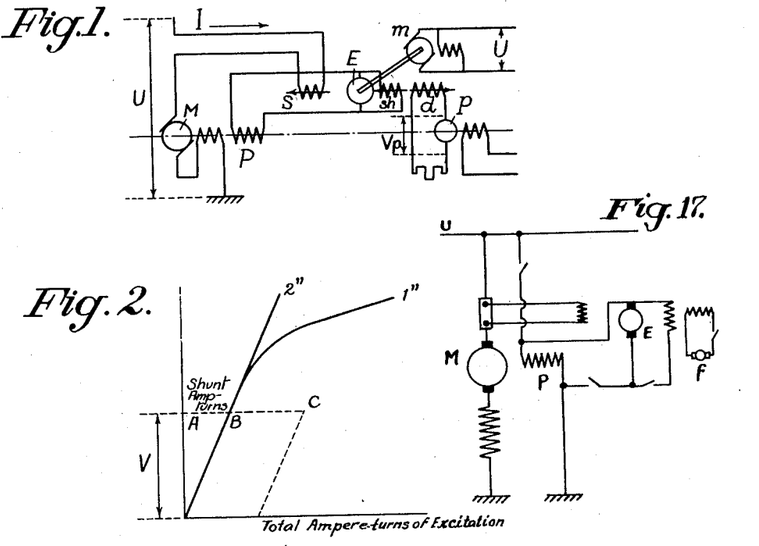
Figure 1 is a diagram showing in simple outline the connections of the motor, main exciter and pilot exciter in one example of a motor control system according to the invention.
Figures 2, 3, 5, 6, 7, 9 to 14, 17 and 18 are other diagrams hereafter explained.

One embodiment of the invention allowing of fulfilling this law is that represented in Figure 1. It is characterized by the use of an exciter E of the well known type having three field windings, viz. a shunt winding $sh$, an independent winding $d$ and a separately excited winding S.

This exciter E is driven at constant speed by a shunt wound motor $m$ fed at the supply voltage U. The diagram in Figure 2 represents the no-load characteristic (curve 1″) of this exciter E as a function of the total ampere-turns of field excitation. The initial part of this characteristic coincides with the straight line 2″ representing the voltage at the terminals of the shunt winding $sh$ of this machine as a function of the ampere-turns of this shunt winding.

It is known that in such a machine, the ampere-turns of the separately excited field winding S must balance the ampere-turns of the independent field winding $d$ in order to allow the operation of the machine on its characteristic curve.

Let $I_d$ be the current flowing in the independent field winding $d$;

$I$ the current flowing in the separate winding S, which is in series with the motor M;

$n$ the number of turns of the independent winding $d$;

$n'$ the number of turns of the separate winding S.

In a machine such as the exciter E regulated as described above, the following equality must hold at every moment:

$$n'I = nI_d,$$

or in other words:

$$I/I_d = \text{constant} = k.$$

The magnitudes of the currents traversing the independent field winding $d$ and the separately excited field winding S are therefore proportional to one another; in Fig. 2, the line BC represents the ampere turns of the separate field S, and the line CB represents the ampere turns of the independent field $d$, though on different scales. The field winding $d$ of the exciter E in Figure 1 is fed by a pilot exciter $p$ driven by the vehicle. The separate winding S is traversed by the current of the motor M. The current $I_d$ is proportional to the speed of the vehicle; since $I/I_d=k$, the current $I$ is also proportional to the speed. It is then true that $I=q \times N$ ($q$ being a constant and $N$ the speed of the vehicle); consequently the starting will be carried out with constant torque.

The voltage equilibrium equation $U=RI+KN\Phi$ requires that for given values of $I$ and $N$, the magnetic flux shall be adjusted to the desired value. The voltage at the terminals of the exciter assumes a value such that the current $I_e$ supplied by the exciter and circulating in the independent field winding P of the motor M shall correspond to the establishment of this flux required by the equilibrium equation. The current $I_e$ will decrease in proportion as the speed increases. The starting of the motor will therefore be effected automatically at constant torque, independently of the saturation of the motor.

It will be seen that under the effect of the pilot exciter $p$ actuated by the vehicle itself and with a judicious regulation of its excitation, there are determined simultaneously at every moment the reduction of the motor flux and the increase of the current taken by the motor.

Figure 3:
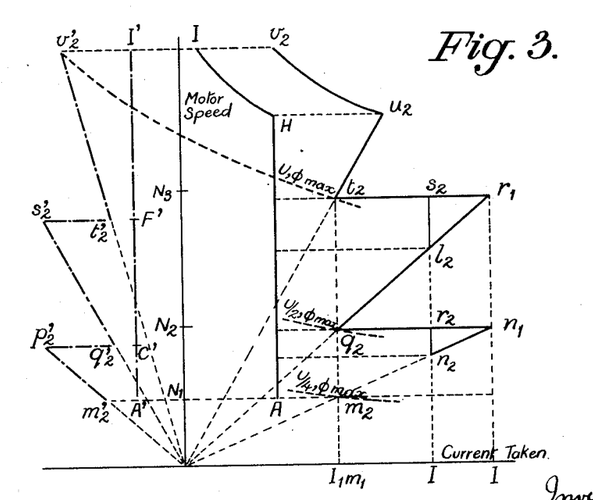

Assume this arrangement is applied to four motors, each motor possessing an exciter E and the voltage of the supply system being U. Figure 3 represents diagrammatically the values of the current taken by each motor in the course of starting, as a function of the speed of the motors. The four motors are first of all connected in series; the supply voltage being U, the voltage applied to each of the motors is therefore U/4. The beginning of the start is obtained by the use of starting resistances, which are eliminated or cut out in the usual way so that from $m_1$ to $m_2$, the starting is carried out at constant magnetic flux $\phi$ and constant current $I_1$. At $m_2$ when the starting resistances have been short circuited, the exciters E are fed by the pilot exciters $p$, and the starting continues automatically up to the point $n_1$ with I/N equal to a constant. At $n_1$ the motors are connected in series-parallel; the voltage applied to each motor becomes U/2. The current taken by the motors is brought back from the value $I_2$ to the value $I_1$ (Figure 3) and therefore the exciter E restores the motor flux to its maximum value, a resistance being interposed in the circuit of the independent field $d$ of the exciter E (Figure 1). The point of operation passes to $q_2$ where the value of the excitation current $I_d$ is the same as at $m_2$.

From $q_2$ to $r_1$ the operation is automatic, like along the line $m_2 n_1$. At $r_1$ the motors are connected in parallel and the full voltage U is applied to each motor. At the same time a fresh resistance is introduced into the circuit of the independent field winding $d$ of the exciter E (Fig. 1). Again the current taken is brought back from the value $I_2$ to the value $I_1$ (Figure 3) and therefore the flux of the motors resumes its maximum value. The point of operation passes to $t_2$, the value of the excitation current $I_d$ is therefore the same as at $m_2$ and $q_2$. From $t_2$ to $u_2$, the operation is automatic. The characteristics of the motor M are designed so that at the point $u_2$ the current $I_e$ in the independent winding P shall be nil. During the second part of the start, the action of the exciter E is suppressed and the operation continues along the line $u_2 v_2$ following the series characteristic of the motors.

Figure 3 shows likewise the law of variation of the torque as a function of the speed (curve A H I). The regulation of the excitation of the pilot exciter $p$ is effected in such a way that the value of the torque at A shall be slightly less than the wheel-skidding torque; the start will therefore be effected with practically constant acceleration and in the minimum time.

This arrangement according to Figure 1 may be employed for bringing the vehicle to a stop with regeneration or recuperation of energy. The pilot exciter $p$ is brought back into service after the connections of the independent field winding $d$ have been inverted; the point of operation passes to $v'_2$ (Figure 3). The motors being connected in parallel, the operation takes place along the characteristic $v'_2 t'_2$; by the effect of the current supplied to the line, the speed falls, which produces a decrease of the current generated and an increase of the magnetic flux. At $t'_2$ the motors are connected in series-parallel and operate under the voltage U/2; a resistance in the excitation circuit $d$ is short circuited and the machine continues to operate along the curve $s'_2 q'_2$. At $q'_2$ the motors are connected in series and the operation terminates along the line $p'_2 m'_2$. The excitation current $I_d$ furnished by the pilot exciters $p$ diminishes gradually with the speed on any given connection, series or parallel, in order to satisfy the relation $I_d/N=$constant. The braking torque furnished by the motors will itself be constant (straight line A' F' I' in Figure 3).

The system thus obtained is stable and not sensitive to sudden variations of the supply voltage. A sudden rise of the latter, for example, tends to increase the current taken by the traction motors, but the terminal voltage of the exciter E also increases, which produces the strengthening of the motor flux and thus opposes any too pronounced rise of the current.

It may be pointed out that with the arrangement which has just been described and which is represented diagrammatically in Figure 1, it is necessary to have the motors operate with half their normal flux for a current equal to twice the normal current; this may in certain cases present difficulties from the point of view of commutation. It is then necessary to limit the maximum current of the motor to a value less than twice the normal current $I_1$ (corresponding to the operation with full magnetic flux), that is, to a value compatible with satisfactory commutation.

The diagram of Figure 3 shows that if it is desired to limit the maximum current of the motor during the start to the value $I_3$, it suffices, upon reaching the point $n_2$ on the characteristic $m_2 n_1$, to feed the independent field winding $d$ of the exciter E at a constant voltage, after disconnecting it from the pilot exciter $p$. The speed of the motor then rises from $n_2$ to $r_2$ at constant current. A similar operation will be carried out on the characteristic $q_2 r_1$ in order to obtain operation at constant current from $l_2$ to $s_2$. In the example of this current limitation shown in Figure 3, the limiting current $I_3$ has been taken as equal to $1.6 \times I_1$.

Figure 4:
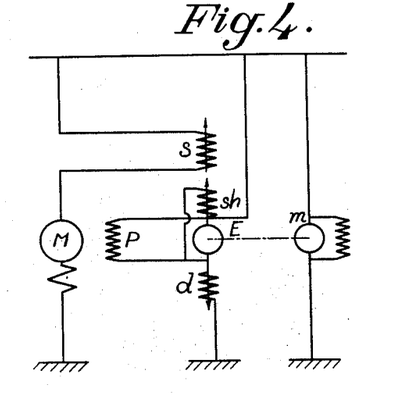
Figures 4 and 8 represent modifications of the control system shown in Figure 1.

The automatic limitation of the motor current to such a suitable value may be obtained by the arrangement shown in Figure 4. The regulation of the current is again effected by an exciter E having three field windings. The separate winding S is still traversed by the traction motor current, but the independent field winding $d$ is fed by two voltages in opposition; that of the traction system (of value U) and that of the exciter E itself.

Figure 5:
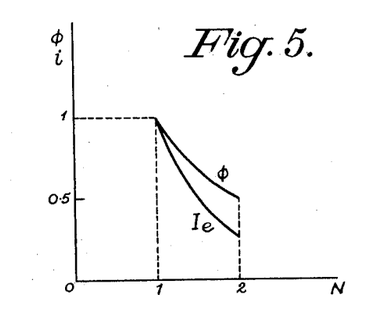

In order to vary the speed of the vehicle or train in the proportion from 1 to 2, for example, the motor field flux will be reduced by half, and the excitation current $I_e$ of the traction motor will vary according to the curve of Figure 5 which is deduced from the magnetization curve of the traction motor. The voltage $U_E$ of the exciter E will vary according to the same law.

Figure 6:
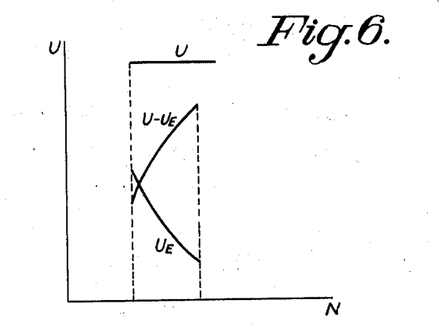

If the curves of the voltage $U_E$ and of the supply voltage U be traced as a function of the speed, as in Figure 6, the current $I_d$ in the independent field winding $d$ of the exciter E will be given by the difference between the two voltages U and $U_E$ divided by the resistance $r$ of the winding $d$.

There will thus be obtained the curve giving the relation $$I_d = f(N) = \frac{U - U_E}{r} = k^1 I.$$

Figure 7:
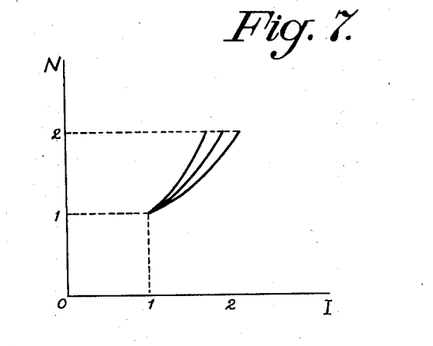

By a judicious selection of the values of the two voltages, it will be possible to obtain a family of curves such as those indicated in Figure 7.

For a given ratio between the motor current at half magnetic flux and the current at full magnetic flux, there exists a well-defined relation between the voltages $U_E$ and $U$.

Figure 8:
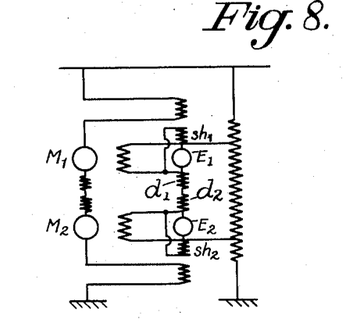

This relation may lead to a rather small size of wire for the field magnet windings. When there are two or more traction motors, this disadvantage is easily avoided by connecting the exciters E of the different motors in series, which divides the excitation voltage of each motor by the number of motors; it may also be diminished to a very great extent by utilizing an adjustable potentiometer which allows of modifying the law of variation of the traction current I of the motors. Figure 8 represents by way of example the arrangement of the system with two motors having a potentiometer feed to the windings $d_1$ and $d_2$ of the exciters $E_1$ and $E_2$. Lastly there can be utilized an auxiliary source of current, such as a generator driven by an auxiliary group or a battery of accumulators, which has the advantage of rendering the motor current I independent of variations in the supply voltage.

Figure 9:
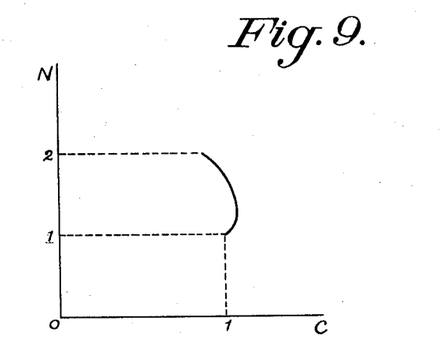

The average value of the traction motor torque can thus be kept equal to the normal value, corresponding to the normal current I and to the normal magnetic flux, between the limits of speed considered; the starting of the vehicle is thus as rapid as in ordinary rheostatic starting. The law $I/N = $ constant is not fulfilled rigorously at every moment of the start but only in average value. The value of the motor torque C as a function of the speed N has the aspect shown in Figure 9.

The law thus obtained, is more favorable for the commutation of the motor than that which would be obtained by keeping the value $I/N$ constant, because for a speed of twice N the magnitude of the current is considerably lower than twice $I_1$. At the intermediate speeds, the value of the current is higher than that corresponding to the relation $I/N = $ constant; but this is without any disadvantage, for at these speeds the commutation is not difficult.

Figure 10:
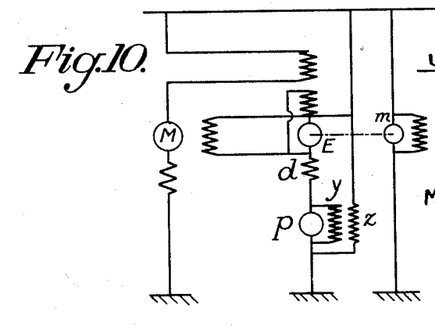

This arrangement can be further improved by providing in the circuit of the independent field $d$ of the exciter E as shown in Figure 10, a generator $p$ driven at a speed proportional to that of the vehicle, the voltage $U_f$ of this generator being added to that $U_E$ of the exciter E itself.

Figure 11:
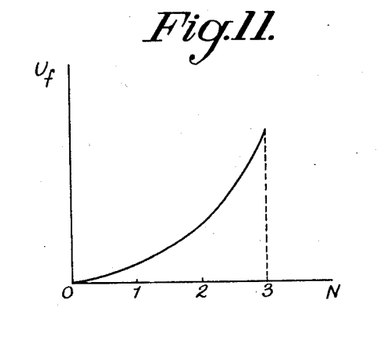
Figure 12:
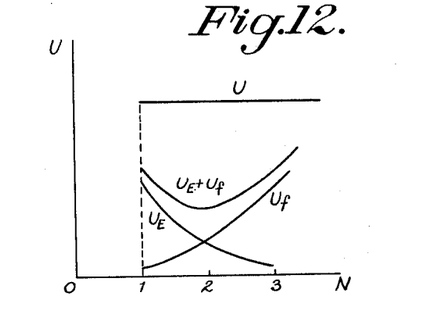
Figure 13:
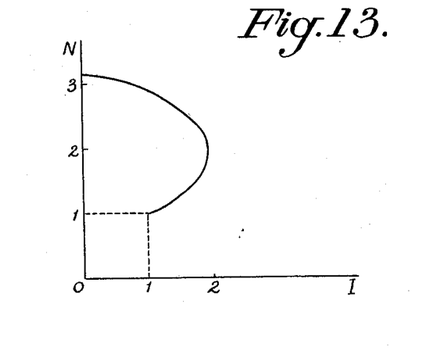

This auxiliary generator $p$ is provided with two field windings, the one a shunt winding $y$ and the other winding $z$ being fed at constant voltage. The voltage $U_f$ of the exciter $p$ varies with the speed according to the curve shown in Figure 11; there can moreover be obtained various other characteristics shown in Figures 12 and 13. These characteristics are variable within very wide limits by a judicious selection of the voltages $U_E$, $U_f$ and of the voltage furnished by a potentiometer (not shown in Figure 10).

It will be seen that it is possible with this system to obtain one part of the motor characteristic analogous with that of a compound-wound motor and to have a limited no-load speed.

This combination presents the advantage of rendering the value of the motor current less sensitive to variations of the supply voltage; in fact, the auxiliary generator $p$ being separately excited from the supply, its voltage varies in the same sense as the supply voltage, and even proportionally thereto if the machine field is not saturated. Since this generator $p$ is connected in opposition to the supply voltage, the increase of its electromotive force reduces to a large extent the variation of the current $I_d$ when the supply voltage U varies.

The different arrangements represented by Figures 4, 8 and 10 allow also of obtaining regenerative braking; it suffices to reverse the feed-connections of the independent field winding $d$ of the exciter E.

Figure 14:
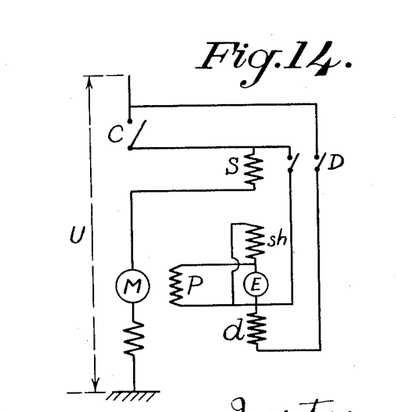

In all the arrangements described for illustrating the invention, when it is desired to pass from normal running to regenerative working, the motors are first disconnected from the supply and the exciter E is brought back into service for the new conditions of operation. But the motors can only be reconnected to the supply system when the electromotive force of the motors balances the supply voltage. The system shown by Figure 14 allows of regulating automatically the flux of the motors in order to obtain the aforesaid equilibrium of the voltages. The motor circuit is opened by disconnecting the switch C, and the separate field winding $d$ of the exciter E is connected across the terminals of the switch C, by closing a two-pole switch D. If the voltage developed by the motors does not balance the line voltage U, a certain current $I_d$ is established in the winding $d$ and the action of the exciter E is thereby modified in such a way that the electromotive force of the motors becomes equal to the supply voltage. In fact, the main circuit being open, the condition of equilibrium of the system is obtained when the motor current I is nil and such condition can only be obtained with nil voltage at the terminals of the switch. It is thus possible after coasting to pick up the drive or to set up regenerative braking without any shock or sudden rush of current.

With the arrangements described, during starting or braking, the torque can be adjusted to the average value desired by means of an adjustable resistance placed in the circuit of the independent field $d$ of the exciter E; the variation of the torque is a function of the speed depending solely on the value of the voltages applied to the winding $d$.

The system can be applied to the starting of one or of two motors. In the case of a single motor, the latter can be provided with one or with two commutators.

Figures 15, 15A, 15B:
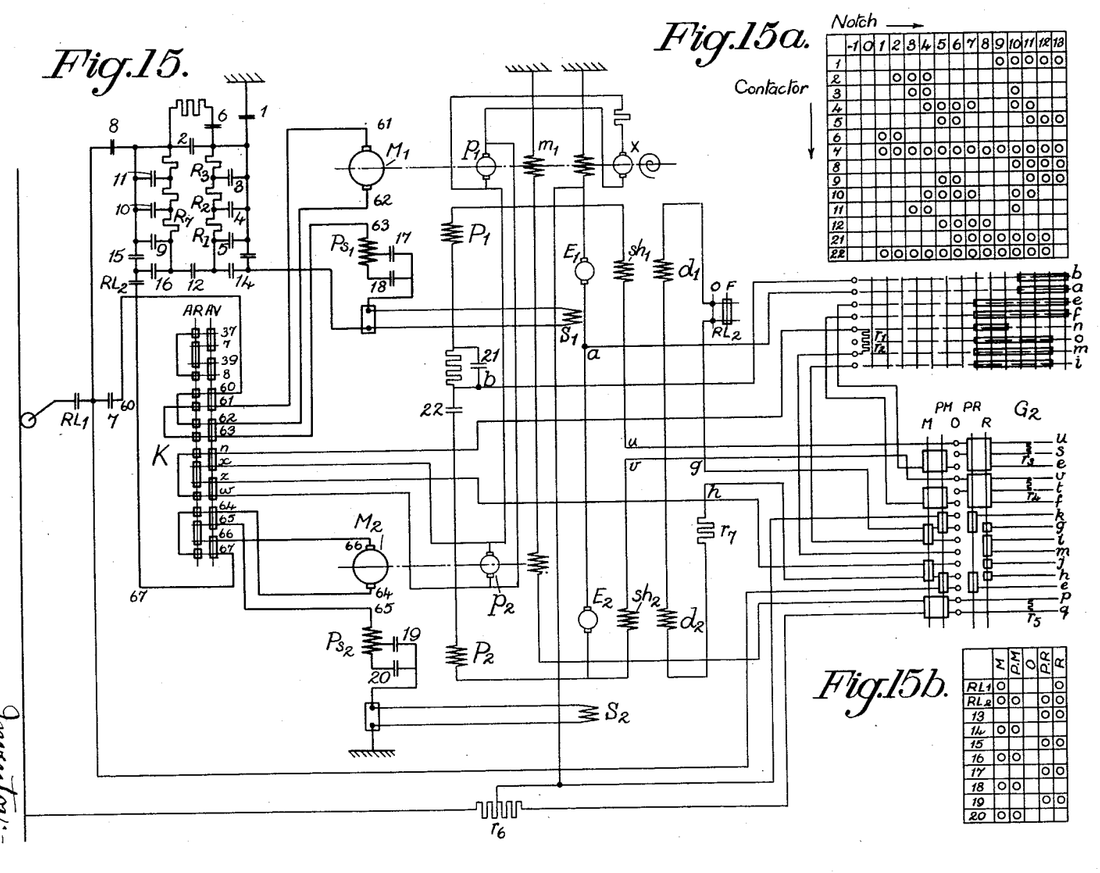

Figure 15 shows a diagram of connections for two traction motors in which the control system represented in Figure 1 is applied, and in which the maximum current is equal to twice the normal current $I_1$.

$M_1$ and $M_2$ are the two traction motors.

$E_1$ and $E_2$ are the two exciters, each having three field windings and corresponding to the motors $M_1$ and $M_2$ respectively.

$p_1$ and $p_2$ are the pilot exciters.

$Ps_1$ and $Ps_2$ are the series field windings of the motors $M_1$ and $M_2$.

$P_1$ and $P_2$ are the independent field windings of the motors $M_1$ and $M_2$, these windings being fed by the exciters $E_1$ and $E_2$.

$S_1$ and $S_2$ are the separately excited field windings of the exciters $E_1$ and $E_2$.

$Sh_1$ and $Sh_2$ are the shunt field windings of the exciters $E_1$ and $E_2$.

$d_1$ and $d_2$ are the independent field windings of the exciters $E_1$ and $E_2$.

$R_1$, $R_2$, $R_3$, . . . $R_7$ represent resistances serving for the starting and coupling of the motors.

$r_1$ $r_2$ $r_3$ represent resistances.

1, 2, 3, . . . 22 represent various contactors upon the motor controller switches.

$RL_1$, $RL_2$, $RL'_2$ represent other contactors.

$G_1$ and $G_2$ are the motor controller switches; the two sequence charts forming Figures 15a and 15b show which contactors of the respective controllers are closed for the different positions of the latter.

K represents the reverser switch.

Figure 16:
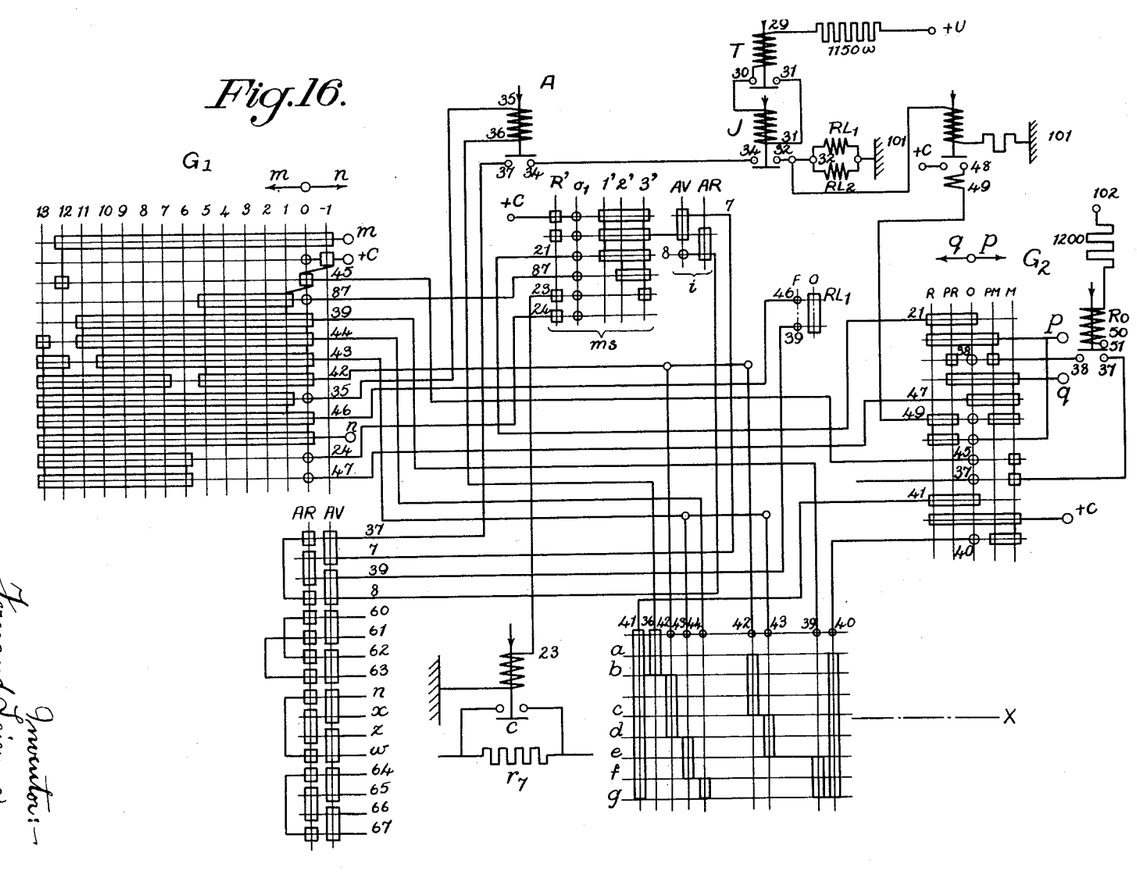

The wiring connections represented diagrammatically in Figure 16 allow of carrying out automatically the different operations necessary for the running of the train.

The driver is provided with a master switch $ms$ and a reverser $i$. The master switch has five positions or notches:

Position of rest: notch $o_1$.

Shunting position: notch 1'. In this position the traction motors remain connected in series upon the starting resistances, in order to allow movements of the train at low speed.

Slow starting position: notch 2'. In this position, the motors start automatically with low torque in order to obviate skidding of the wheels when the rails are slippery.

Normal starting position: notch 3'. In this position the motors start automatically with normal torque.

Braking position: notch R'. In this position, the motors provide braking with regeneration to the line.

The reverser $i$ has two positions or notches AV and AR, for forward and reverse running of the train.

The inversion of the connections of the motor armatures $M_1$ and $M_2$ and the reversal of the current in the independent fields $d_1$ and $d_2$ of the exciters $E_1$ and $E_2$ (Fig. 15) are effected automatically by the reverser switch K operated by the controller $G_1$ (Fig. 16).

The controllers $G_1$ and $G_2$ are operated by servo-motors. The conductors $m$ and $n$ of the servo-motor for the controller $G_1$ and $p$ and $q$ of the servo-motor for $G_2$ may be connected to the pole $+C$ of the master switch; according as $m$ or $n$ is connected to this pole $+C$, the servomotor for $G_1$ will rotate in one direction or the other, and likewise for $G_2$ as regards $p$ or $q$. Moreover when one of these conductors is connected to the pole $+C$, the servo-motor in question can rotate only by one revolution in the selected direction, which brings about the displacement of the contact fingers of the controller $G_1$ or $G_2$ from one notch to the next notch, after which the controller is held fast in the new position; an arrangement of this kind is described in U. S. A. Patent Specification No. 1,839,312. The particular diagram of these servomotors has not been represented in the drawings, since it corresponds to a known type of connection.

The wiring diagram shown in Fig. 16 further comprises:—

A maximum voltage relay T which comes into operation when the voltage exceeds a fixed value.

A minimum voltage relay J.

An automatic relay A for stopping the regeneration at the limiting speed.

A coupling relay $R_0$.

A torque motor X.

*Normal starting*

The finger of the master switch, Figure 16, is placed at the notch 3' and the reverser $i$ at the forward notch AV. If the motor connections correspond to forward running, the reverser switch K being at AV, the conductor $p$ of the servomotor for $G_2$ is connected to the pole $+C$ by way of 1''. The controller $G_2$ moves from the notch O (Figure 15b) to the notch PM (preparatory to running). The relays $RL_2$, the contactors 14, 16, 18 and 20, and the circuits $se$—$ft$—$kg$—$hl$ and $pq$ are closed (Figure 15).

Since the difference of potential at the terminals of $RL_2$ is nil, the relay $R_0$ does not operate. The circuit 37—38 is closed and the servomotor for $G_2$ fed by conductor $p$ displaces the contact finger of the controller $G_2$ from the notch PM to the notch M (running). The contactor $RL_1$ is closed mechanically by means of a cam carried on the shaft of the controller $G_2$. The traction motors $M_1$ and $M_2$ are connected in series with all the starting resistances. But the contactor 7 being open, the starting does not yet take place.

The controller $G_2$ being now at the position M, the circuit 37—45 is closed. The current enters at $m$ and causes the servomotor to drive the controller $G_1$ which moves into the position of notch 1 (Figure 15a), and the traction motors start.

The current coming from $+C$ can pass by 2'' and reach the servo-motor for controller $G_1$ by way of conductor $m$. $G_1$ is therefore brought to occupy successively the notches 2, 3 and 4, bringing about the successive elimination of the starting resistances, and then the notch 5, the motors being thus in series without resistances. Finally the controller $G_1$ occupies the notch 6 which produces the closing of the circuit of the pilot exciters ($f_1$ and $f_2$ close) and the closing of the circuit of the shunt windings $sh_1$ and $sh_2$ of $E_1$ and $E_2$.

The torque motor X (Figures 15 and 16) possesses a driving torque proportional to the speed of the train; this torque is balanced by an antagonistic torque (produced for example by a spiral spring fixed upon the shaft), in such a way that the motor occupies well-defined positions for different speeds of the train. So long as the contact finger operated by the torque motor X has not reached the point $c$, the controller $G_1$ will remain at the notch 6. Once the speed of the train is sufficient to bring the finger to the point $c$, the circuit C, 40, 43 closes, and the controller $G_1$ occupies the notches 7 and 8 for the preparation of the parallel connection of the traction motors.

At the notch 9, the motors are connected in parallel, with resistances in the circuit of each motor. At the same time the exciters $E_1$ and $E_2$ are likewise connected in parallel. A resistance $r_1$ is introduced into the independent field circuit of $E_1$ and $E_2$. At the notches 10 and 11, the starting resistances are eliminated. At the notch 12, the independent field of $E_1$ and $E_2$ is cut out. The controller $G_1$ cannot pass to the notch 13, until the torque motor X has reached the point $e$; at this moment the shunt excitation to $E_1$ and $E_2$ is cut off, and the traction motors operate upon their series characteristic.

*Coasting*

The master switch $ms$ is returned to the position of rest, notch $o_1$. The circuit C, 37, 34, 32, 33 is interrupted and consequently the relay H ceases to operate; the circuit +C, 48 is closed, connecting $q$ to +C, by way of 49, producing a rotation of the controller $G_2$ in the opposite direction to that of the starting operation, until it comes to occupy the position O.

During this time the speed of the train will diminish; the torque motor occupies a position lying between $f$ and $g$, the controller $G_2$ being at O. The circuit C, 41, 44 is closed, the controller $G_1$ is fed by the conductor $n$ and passes back to the notch 12. When in its rotation the torque motor X leaves the point $f$ in order to move back towards $e$, the circuit 41, 43 will be closed and the controller $G_1$ will pass to the notch 11, and so on.

Resumption of drive

If it is desired to pick up the drive again, the master switch $ms$ is placed at the position 3'. 1'' is fed with current and the controller $G_2$ passes to the position PM. But $G_2$ cannot reach the point M, except when the differential of potential at the terminals of $RL_1$ becomes nil; otherwise the circuit 37, 38 is open. The torque motor X produces a reconnection of the motors, series or parallel, appropriate to the speed of the train at this moment; the conditions of running have thus returned to the characteristics of the starting operation already explained.

Regeneration

While the train is coasting, the master switch being therefore at $o_1$ (Figure 16), the controller $G_2$ at O, and the controller $G_1$ at a position dependent on the speed, the traction motors may be brought into operation for regenerative braking.

The master switch is placed at the position R'. The circuit C, 3'', 47 is closed and the controller $G_2$ comes to PR (preparatory to regeneration). If the controller $G_1$ is upon one of the notches 1, 2, 3, 4, 5, regeneration is not possible. On the other hand, regeneration takes place if the controller $G_1$ is on one of the notches 6 to 13; in this case, the series field windings of the motors are shunted, and the resistances of the shunt circuits of the regulators or exciters are short circuited. The independent windings $d_1$ and $d_2$ of the exciters $E_1$ and $E_2$ are in series with the traction motors in such a way as to regulate the flux of the motors so that their voltage balances that of the supply.

At this instant the circuit 37, 38 is closed and the contact finger of the controller $G_2$ comes to occupy the position R.

The circuit of the exciters $p_1$ and $p_2$ is closed but the direction of the current therein is reversed in relation to that of the running position. By the operation of the circuits 41, 44 and 41, 43 and 41, 42 the controller $G_1$ returns as far as the notch 6.

When the torque motor X reaches the point $b$, the circuit 41, 36 closes, the relay A opens circuit 37, 34, and the regeneration ceases, while the controller $G_1$ returns to $o$. The circuit +C, 48, 49 being again closed, the controller $G_2$ comes to O.

All the parts are therefore ready for the next starting operation.

Remarks

1. Reverse running.

When the master switch is placed in the position 1' and the reverser $i$ at AR, the current passes by way of 8, 39; the circuit 39, 46 is always closed while $RL_1$ 101 is open. The controller $G_1$ comes then to the notch $-1$; this operation brings the reverser switch $k$ to the position AR. The current coming from C passes by the conductor $m$ and returns the controller $G_1$ to the notch $o$; all the parts are then ready for the start.

2. Function of the notch 1' of the master switch. So long as the contact finger of the master switch remains upon the notch 1', the circuit +C, 2'' will remain open and the servo-motor for the controller $G_1$ will not be fed with current; the contact finger of the controller $G_1$ will remain upon the notch 1.

This allows a displacement of the train for shunting and like operations and movements of small extent.

3. Function of the notch 2' of the master switch. When it is desired to drive with low torque, a resistance $r_1$ is introduced into the circuit of the independent field $d_1$ and $d_2$ of the exciters $E_1$ and $E_2$, in order to reduce their excitation currents $Id_1$ and $Id_2$; this brings about a corresponding reduction in the current I of the traction motors, which reduces the driving torque. This resistance $r_7$ (Figure 16) can be short circuited by the relay C fed by the lead 4''.

In all the systems described up to this point, the exciter with three field windings is driven at constant speed. The shunt motor employed for driving the exciter can however be suppressed; the exciter may then be driven by the axle of the vehicle.

The advantages of such an arrangement are the following;

1. Diminution of the losses due to the continuous operation of this motor in the case of lines with frequent stops.

2. Reduction of bulk. Moreover the construction of small shunt motors subjected to sudden variations of voltage presents some difficulties.

In this case, the speed of the exciter is therefore proportional to the speed of the train, whereas in the arrangements previously described herein the exciter operated at constant speed.

The acceleration torque is still maintained constant during the start, that is to say that the law $I/N$=constant, for a given voltage of supply for the motors, can still be realized.

Figure 18:
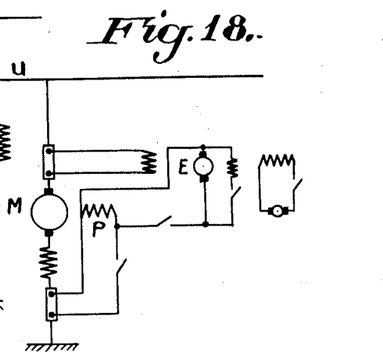

During the start from $m_1$ to $m_2$ (Fig. 3), the external circuit of the regulating exciter E feeding the independent field winding P of the motor M is open and this winding is connected to the supply system (Figure 17) or placed in series with the circuit of the motor M (Figure 18).

The starting takes place from $m_1$ to $m_2$, in the first case as a compound-wound motor, in the second case as an ordinary series motor.

At the point $m_2$, the connections of the winding P are modified, and this winding P is now fed by the three winding exciter E.

In order to preserve the conditions of operation described above, it is necessary to maintain the strength of the independent field of the exciter on a line parallel to the straight portion of the no-load characteristic, that is to say that at each moment the equation $kN=r$ must be satisfied, N being the number of revolutions per minute of the exciter, and $r$ the resistance of the circuit of the shunt field; $r$ must therefore vary proportionally to N.

This is realized by resistances introduced into the circuit of the shunt excitation (Fig. 17), by the aid of a centrifugal governor, or by relays traversed by the current of the pilot exciter $p$ in order to obtain the relation $I=f(N)$.

What I claim is:—

1. A direct current motor control system, comprising a substantially constant-voltage source of power, a motor, means for applying voltage from said source of power to said motor, a series field and an independent field for said motor, said series and independent fields acting cumulatively and a generator for exciting said independent motor field, said generator having shunt and independent field windings and also a separate field winding excited by the current of said motor, said last mentioned field winding acting cumulatively with said shunt field winding and in opposition to said independent field winding, and means for keeping the current in the independent field of said generator proportional to the motor current in said separate field winding as the motor accelerates.

2. A direct current motor control system, comprising a substantially constant-voltage source of power, a motor, means for applying voltage from said source of power to said motor, a series field and an independent field for said motor, said series and independent fields acting cumulatively, an exciter for said independent field, said exciter having shunt and independent field windings and also a separate field winding excited by the current of said motor, and means for exciting the independent field winding of said exciter with a current derived from two opposing voltages, one of said opposing voltages being the voltage applied to the motor, and the other of said opposing voltages being that of said exciter, the independent and the separate fields of said exciter neutralizing one another in stable working conditions, and said exciter reducing the total magnetic flux of said motor as the motor accelerates.

3. A control system for a plurality of direct current motors having cumulative series and independent fields, comprising a plurality of exciters feeding the independent fields of the respective motors, each of said exciters having a shunt field, a separately excited field and an independent field acting in opposition to the other two, the said separately excited field of each exciter being energized by the current of the respective motor, a plurality of pilot exciters, means for driving said pilot exciters at speeds proportional to the respective motors, each of said pilot exciters energizing the independent field of the respective exciter, a source of power for said motors, and means for connecting said motors to said source of power in series and in parallel, each of said exciters acting under the increasing effect of the respective pilot exciter to reduce the field strength of the respective motor progressively in the series and parallel connections of said motors as the motors accelerate.

4. A control system for a plurality of direct current motors having cumulative series and independent fields, comprising a plurality of exciters feeding the independent fields of the respective motors, each of said exciters having a shunt field, a separately excited field and an independent field, with said separately excited field energized by the current of the respective motor and acting in opposition to the independent field, a plurality of pilot exciters energizing the independent fields of the respective exciters, a source of power for said motors, and means for connecting said motors to said source of power in series and in parallel.

5. A control system for a plurality of direct current motors having cumulative series and independent fields, comprising a plurality of exciters feeding the independent fields of the respective motors, each of said exciters having a shunt field, a separately excited field and an independent field, with said separately excited field energized by the current of the respective motor and acting in opposition to the independent field, a plurality of pilot exciters energizing the independent fields of the respective exciters, means for driving said pilot exciters at speeds proportional to the respective motors, a source of power for said motors, means for connecting said motors to said source of power in series and in parallel, said pilot exciters effecting an automatic progressive reduction of the independent motor field strength in the series and parallel connections as the motors accelerate, and means for connecting said motors to said source of power in parallel and in series for regenerative braking, said pilot exciters then effecting an automatic progressive increase of the independent field strength of the motors in the parallel and series connections as said motors decelerate.

6. A constant-torque control system for the starting of direct current traction motors, comprising a traction motor having a separately excited field winding, a source of power for said traction motor, means for applying voltage from said source of power to said traction motor, an exciter having three field windings, shunt, separate and independent respectively, and feeding said separately excited field winding of the traction motor, the shunt field winding of said exciter having a resistance such that the line representing the relation of the exciter voltage to the shunt field current coincides with the initial straight part of the no-load characteristic representing the relation of the exciter voltage on open circuit to the total ampere-turns of excitation below the field magnet saturation point, the separate field winding acting cumulatively to said shunt field winding during starting and being energized by the traction motor current, and the independent field winding acting in opposition to said shunt field winding during starting, means for energizing said independent field winding, and means for increasing the voltage of said energizing means with the rise of traction motor speed, the arrangement being such that the separate and independent field windings of the exciter acting in opposition to one another will normally balance out so that the exciter voltage and therefore the magnetic flux of the traction motor will vary inversely as the motor speed while the motor armature current will increase uniformly with the motor speed.

7. A constant-torque control system for the starting and regenerative braking of direct current traction motors, comprising a traction motor having a separately excited field winding, a source of power for said traction motor, means for applying voltage from said source of power to said motor, an exciter having three field windings, shunt, separate and independent respectively, and feeding said separately excited field winding of the traction motor, the shunt field winding of said exciter having a resistance such that the line representing the relation of the exciter voltage to the shunt field current coincides with the initial straight part of the no-load characteristic representing the relation of the exciter voltage on open circuit to the total ampere-turns of excitation below the field magnet saturation point, the separate field winding acting cumulatively to said shunt field winding during starting and in opposition thereto during regenerative braking and being energized in both cases by the traction motor current, and the independent field winding acting in opposition to said shunt field winding during starting and cumulatively thereto during regenerative braking, means for energizing said independent field winding, and means for increasing the voltage of said energizing means in both cases with the rise of traction motor speed, the arrangement being such that the separate and independent field windings of the exciter acting in opposition to one another will normally balance out so that the exciter voltage and therefore the magnetic flux of the traction motor will vary inversely as the motor speed while the motor armature current will increase uniformly with the motor speed in starting and decrease uniformly with the motor speed in regenerative braking.

8. A direct current motor control system, comprising a substantially constant-voltage source of power, a motor, means for applying a voltage increasing by steps from said source of power to said motor, a separately excited field for said motor, a generator for exciting said motor field, means for driving said generator at constant speed, said generator having shunt and independent field windings and also a separate field winding excited by the armature current of said motor, and means for varying the current in the independent field winding of said generator, said field current varying means acting to decrease the generator voltage and thereby to increase the armature current taken by the motor as said motor accelerates between steps in the increase of the voltage applied to said motor.

FERNAND LEJEUNE.